US009681251B1

(12) United States Patent  
Ahn et al.

(10) Patent No.: US 9,681,251 B1
(45) Date of Patent: Jun. 13, 2017

(54) CUSTOMIZATION FOR PRELOADED APPLICATIONS

(71) Applicant: Sprint Communications Company L.P., Overland Park, KS (US)

(72) Inventors: Chul Jin Ahn, Irvine, CA (US); Jagannath Ghoshal, Overland Park, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 35 days.

(21) Appl. No.: 14/231,718

(22) Filed: Mar. 31, 2014

(51) Int. Cl.
*H04W 4/00* (2009.01)
*H04W 8/18* (2009.01)

(52) U.S. Cl.
CPC ............. *H04W 4/001* (2013.01); *H04W 8/18* (2013.01); *H04W 8/183* (2013.01)

(58) Field of Classification Search
CPC .. H04W 8/265; H04W 8/26; H04L 29/06823; H04L 41/0806
USPC ........................................ 455/418, 419, 411
See application file for complete search history.

(56) References Cited

U.S. PATENT DOCUMENTS

| | | | |
|---|---|---|---|
| 6,131,024 A | 10/2000 | Boltz | |
| 6,445,914 B1 | 9/2002 | Findikli et al. | |
| 6,753,887 B2 | 6/2004 | Carolan et al. | |
| 7,027,773 B1 | 4/2006 | McMillin | |
| 7,165,191 B1 | 1/2007 | Vakrat | |
| 7,260,382 B1 | 8/2007 | Lamb et al. | |
| 7,266,371 B1 | 9/2007 | Amin et al. | |
| 7,409,208 B1 | 8/2008 | Clare et al. | |
| 7,493,111 B2 | 2/2009 | Knowles | |
| 7,530,079 B2 | 5/2009 | Stubbs et al. | |
| 7,817,988 B2 | 10/2010 | Kruis et al. | |
| 7,904,895 B1 | 3/2011 | Cassapakis et al. | |
| 7,991,988 B2 * | 8/2011 | Chen ........................ G06F 8/65 455/418 |

(Continued)

FOREIGN PATENT DOCUMENTS

| | | |
|---|---|---|
| EP | 2079256 A1 | 7/2009 |
| EP | 2461613 A1 | 6/2012 |

(Continued)

OTHER PUBLICATIONS

Notice of Allowance dated Apr. 26, 2012, U.S. Appl. No. 12/962,620, filed Dec. 7, 2010.

(Continued)

*Primary Examiner* — Vladimir Magloire
*Assistant Examiner* — Donald H. B. Braswell

(57) ABSTRACT

A mobile communication device. The mobile communication device comprises a processor, a memory, and an application stored in the memory that, when executed by the processor, parses an open mobile alliance (OMA) device management (DM) tree comprising a node that identifies a matrix, wherein the matrix comprises columns indexed by a brand identity, and rows indexed by a service identity, wherein the matrix cells store configuration values and wherein some configuration values are function calls, based on a brand identity of the mobile communication device, selects an entry of the matrix, and based on the selected entry, configures a preloaded application stored in the memory, whereby the mobile communication device may be configured remotely through a rule-based mechanism.

15 Claims, 9 Drawing Sheets

(56) References Cited

U.S. PATENT DOCUMENTS

| | | |
|---|---|---|
| 8,107,926 B2 | 1/2012 | Goto |
| 8,185,097 B2 | 5/2012 | Vanderlinden et al. |
| 8,185,101 B1 | 5/2012 | Wiseman et al. |
| 8,249,654 B1 | 8/2012 | Zhu |
| 8,260,281 B2 | 9/2012 | Urbanek |
| 8,401,538 B2 | 3/2013 | Urbanek |
| 8,401,595 B2 | 3/2013 | Zhu et al. |
| 8,433,953 B1 | 4/2013 | Gaudette et al. |
| 8,442,521 B2 | 5/2013 | Fleischman et al. |
| 8,468,164 B1 | 6/2013 | Paleja et al. |
| 8,522,343 B2 | 8/2013 | Hernacki |
| 8,571,536 B2 | 10/2013 | Urbanek |
| 8,612,967 B1 | 12/2013 | Delker |
| 8,626,165 B1 | 1/2014 | Narasimhan et al. |
| 8,639,245 B2 | 1/2014 | Shi et al. |
| 8,666,383 B1 | 3/2014 | Mauer et al. |
| 8,699,377 B2 | 4/2014 | Veillette |
| 8,819,188 B2 * | 8/2014 | Blatherwick ......... H04L 67/303 709/220 |
| 8,825,039 B2 | 9/2014 | Mizuguchi |
| 8,855,012 B1 | 10/2014 | Suri |
| 8,909,211 B2 | 12/2014 | Huq et al. |
| 8,909,291 B1 | 12/2014 | Spanel et al. |
| 8,938,436 B2 | 1/2015 | Kozempel |
| 8,965,366 B1 | 2/2015 | Somayajula et al. |
| 9,020,479 B1 | 4/2015 | Somayajula et al. |
| 9,026,105 B2 | 5/2015 | Shipley et al. |
| 9,042,877 B1 | 5/2015 | Ghoshal et al. |
| 9,098,368 B1 | 8/2015 | Delker |
| 9,100,769 B2 | 8/2015 | Annan et al. |
| 9,100,819 B2 | 8/2015 | Annan et al. |
| 9,124,719 B2 | 9/2015 | Inlow et al. |
| 9,125,037 B2 | 9/2015 | Masterson et al. |
| 9,143,924 B1 | 9/2015 | Abou-El-Ella et al. |
| 9,161,209 B1 | 10/2015 | Ghoshal et al. |
| 9,161,325 B1 | 10/2015 | Urbanek |
| 9,170,870 B1 | 10/2015 | Masterson et al. |
| 9,198,027 B2 | 11/2015 | Urbanek |
| 9,204,239 B1 | 12/2015 | Sumner |
| 9,204,286 B1 | 12/2015 | Annan et al. |
| 9,208,513 B1 | 12/2015 | Mauer et al. |
| 9,226,133 B1 | 12/2015 | Spanel et al. |
| 9,280,483 B1 | 3/2016 | Ghoshal et al. |
| 9,301,081 B1 | 3/2016 | Callan et al. |
| 9,304,668 B2 | 4/2016 | Rezende et al. |
| 9,307,400 B1 | 4/2016 | Blinn et al. |
| 9,313,643 B1 | 4/2016 | Ghoshal et al. |
| 9,319,270 B2 | 4/2016 | Bestmann et al. |
| 9,357,378 B1 | 5/2016 | Delker et al. |
| 9,363,622 B1 | 6/2016 | Ahn et al. |
| 9,392,395 B1 | 7/2016 | Indurkar |
| 9,398,462 B1 | 7/2016 | Delker et al. |
| 9,420,399 B2 | 8/2016 | Urbanek |
| 9,420,496 B1 | 8/2016 | Indurkar |
| 9,426,641 B1 | 8/2016 | Ghoshal et al. |
| 9,439,025 B1 | 9/2016 | Ghoshal et al. |
| 9,451,446 B2 | 9/2016 | Spanel et al. |
| 9,532,211 B1 | 12/2016 | Sumner |
| 9,549,009 B1 | 1/2017 | Annan et al. |
| 9,603,009 B1 | 3/2017 | Indurkar |
| 2002/0091931 A1 | 7/2002 | Quick, Jr. et al. |
| 2002/0142783 A1 | 10/2002 | Yoldi et al. |
| 2003/0023514 A1 | 1/2003 | Adler et al. |
| 2003/0031235 A1 | 2/2003 | Kim et al. |
| 2003/0217145 A1 | 11/2003 | Leung et al. |
| 2004/0033798 A1 | 2/2004 | Robin et al. |
| 2004/0092248 A1 | 5/2004 | Kelkar et al. |
| 2004/0093109 A1 | 5/2004 | O'Connor et al. |
| 2004/0116163 A1 | 6/2004 | Kim et al. |
| 2004/0137890 A1 | 7/2004 | Kalke |
| 2004/0137891 A1 | 7/2004 | Clark et al. |
| 2004/0254975 A1 | 12/2004 | Teh et al. |
| 2004/0261041 A1 | 12/2004 | Parakkuth et al. |
| 2005/0020308 A1 | 1/2005 | Lai |
| 2005/0079855 A1 | 4/2005 | Jethi et al. |
| 2005/0079863 A1 | 4/2005 | Macaluso |
| 2005/0085222 A1 | 4/2005 | Przybilski et al. |
| 2005/0114114 A1 | 5/2005 | Rudolph |
| 2005/0119001 A1 | 6/2005 | Watanabe |
| 2005/0164737 A1 | 7/2005 | Brown |
| 2005/0188262 A1 | 8/2005 | Rosenman et al. |
| 2005/0197098 A1 | 9/2005 | Trossen |
| 2005/0203703 A1 | 9/2005 | Chang |
| 2006/0025151 A1 | 2/2006 | Karaoguz et al. |
| 2006/0121894 A1 | 6/2006 | Ganesan |
| 2006/0126620 A1 | 6/2006 | Bonar et al. |
| 2006/0135144 A1 | 6/2006 | Jothipragasam |
| 2006/0154651 A1 | 7/2006 | Knowles |
| 2006/0203722 A1 | 9/2006 | Oommen |
| 2006/0208071 A1 | 9/2006 | Chang et al. |
| 2006/0235944 A1 | 10/2006 | Haslam |
| 2006/0236325 A1 | 10/2006 | Rao et al. |
| 2006/0242150 A1 | 10/2006 | Jogand-Coulomb et al. |
| 2006/0246949 A1 | 11/2006 | Gupta et al. |
| 2007/0004404 A1 | 1/2007 | Buckley et al. |
| 2007/0015538 A1 | 1/2007 | Wang |
| 2007/0043667 A1 | 2/2007 | Qawami et al. |
| 2007/0082655 A1 | 4/2007 | Link, II et al. |
| 2007/0099599 A1 | 5/2007 | Smith et al. |
| 2007/0129057 A1 | 6/2007 | Xu et al. |
| 2007/0130156 A1 | 6/2007 | U. Tenhunen et al. |
| 2007/0165654 A1 | 7/2007 | Chai et al. |
| 2007/0169084 A1 | 7/2007 | Frank et al. |
| 2007/0190939 A1 | 8/2007 | Abel |
| 2007/0192854 A1 | 8/2007 | Kelley et al. |
| 2007/0197234 A1 | 8/2007 | Gill et al. |
| 2007/0250645 A1 | 10/2007 | Meadows et al. |
| 2007/0254635 A1 | 11/2007 | Montelius |
| 2008/0022395 A1 | 1/2008 | Holtzman et al. |
| 2008/0039114 A1 | 2/2008 | Phatak et al. |
| 2008/0046583 A1 | 2/2008 | Rao |
| 2008/0046880 A1 | 2/2008 | Jun et al. |
| 2008/0046997 A1 | 2/2008 | Wang |
| 2008/0051076 A1 | 2/2008 | O'Shaughnessy et al. |
| 2008/0057957 A1 | 3/2008 | Altbaum et al. |
| 2008/0062900 A1 | 3/2008 | Rao |
| 2008/0065753 A1 | 3/2008 | Rao |
| 2008/0109662 A1 | 5/2008 | Natarajan et al. |
| 2008/0146280 A1 | 6/2008 | Sasse et al. |
| 2008/0155275 A1 | 6/2008 | Natarajan et al. |
| 2008/0160970 A1 | 7/2008 | Srinivas Reddy et al. |
| 2008/0167027 A1 | 7/2008 | Gautier et al. |
| 2008/0171532 A1 | 7/2008 | Shieh et al. |
| 2008/0188210 A1 | 8/2008 | Choi et al. |
| 2008/0225806 A1 | 9/2008 | Arian et al. |
| 2008/0281511 A1 | 11/2008 | Miyata |
| 2008/0300967 A1 | 12/2008 | Buckley et al. |
| 2008/0318547 A1 | 12/2008 | Ballou, Jr. et al. |
| 2009/0036165 A1 | 2/2009 | Brede |
| 2009/0061840 A1 | 3/2009 | Fleischman et al. |
| 2009/0075592 A1 | 3/2009 | Nystrom et al. |
| 2009/0093242 A1 | 4/2009 | Bhalekar et al. |
| 2009/0094350 A1 | 4/2009 | Rive et al. |
| 2009/0106200 A1 | 4/2009 | Salinas et al. |
| 2009/0124250 A1 | 5/2009 | Topaltzas et al. |
| 2009/0156190 A1 | 6/2009 | Fisher |
| 2009/0156209 A1 | 6/2009 | Franklin et al. |
| 2009/0239518 A1 | 9/2009 | Feuillette |
| 2009/0247124 A1 | 10/2009 | de Atley et al. |
| 2009/0259974 A1 | 10/2009 | Lin |
| 2009/0260004 A1 | 10/2009 | Datta et al. |
| 2009/0307763 A1 | 12/2009 | Rawlins et al. |
| 2010/0048193 A1 | 2/2010 | Ortion et al. |
| 2010/0060456 A1 | 3/2010 | Forster |
| 2010/0075669 A1 | 3/2010 | Sparks et al. |
| 2010/0080143 A1 | 4/2010 | Topaltzas et al. |
| 2010/0133335 A1 | 6/2010 | Maguid et al. |
| 2010/0136960 A1 | 6/2010 | Knezevic |
| 2010/0138652 A1 | 6/2010 | Sela et al. |
| 2010/0159876 A1 | 6/2010 | Brown et al. |
| 2010/0161724 A1 | 6/2010 | Sathyan et al. |
| 2010/0161928 A1 | 6/2010 | Sela et al. |
| 2010/0167696 A1 | 7/2010 | Smith et al. |
| 2010/0190479 A1 | 7/2010 | Scott et al. |

(56) References Cited

U.S. PATENT DOCUMENTS

| | | |
|---|---|---|
| 2010/0192120 A1 | 7/2010 | Raleigh |
| 2010/0194632 A1 | 8/2010 | Raento et al. |
| 2010/0198939 A1 | 8/2010 | Raleigh |
| 2010/0203864 A1 | 8/2010 | Howard |
| 2010/0207742 A1 | 8/2010 | Buhot et al. |
| 2010/0222031 A1 | 9/2010 | Carolan et al. |
| 2010/0222047 A1 | 9/2010 | Vanderlinden et al. |
| 2010/0250368 A1 | 9/2010 | Porco |
| 2010/0262638 A1 | 10/2010 | Fitzgerald |
| 2010/0291898 A1 | 11/2010 | Sanding et al. |
| 2010/0311391 A1 | 12/2010 | Siu et al. |
| 2010/0311404 A1 | 12/2010 | Shi et al. |
| 2010/0311468 A1 | 12/2010 | Shi et al. |
| 2010/0312794 A1 | 12/2010 | Liu |
| 2010/0325622 A1 | 12/2010 | Morton |
| 2010/0332639 A1 | 12/2010 | Diaz et al. |
| 2011/0003590 A1 | 1/2011 | Yoon et al. |
| 2011/0014913 A1 | 1/2011 | Yoon et al. |
| 2011/0026501 A1 | 2/2011 | Sharaga et al. |
| 2011/0028138 A1 | 2/2011 | Davies-Moore et al. |
| 2011/0030062 A1 | 2/2011 | Hsu et al. |
| 2011/0035421 A1 | 2/2011 | Laird-McConnell et al. |
| 2011/0069702 A1 | 3/2011 | Oktay et al. |
| 2011/0081885 A1 | 4/2011 | Sennett et al. |
| 2011/0086611 A1 | 4/2011 | Klein et al. |
| 2011/0119716 A1 | 5/2011 | Coleman, Sr. |
| 2011/0136482 A1 | 6/2011 | Kaliner |
| 2011/0138074 A1 | 6/2011 | Onda et al. |
| 2011/0161659 A1 | 6/2011 | Himawan et al. |
| 2011/0165836 A1 | 7/2011 | Dixon et al. |
| 2011/0173685 A1* | 7/2011 | Chai .............. H04L 41/0806 726/6 |
| 2011/0202680 A1 | 8/2011 | Bells et al. |
| 2011/0202976 A1 | 8/2011 | Chow et al. |
| 2011/0208338 A1 | 8/2011 | Eteminan et al. |
| 2011/0208865 A1 | 8/2011 | Knowles et al. |
| 2011/0222404 A1 | 9/2011 | Watson et al. |
| 2011/0230136 A1 | 9/2011 | Washiro |
| 2011/0258249 A1 | 10/2011 | Biggs et al. |
| 2011/0263294 A1 | 10/2011 | Kim et al. |
| 2011/0294484 A1 | 12/2011 | Martin et al. |
| 2011/0296399 A1 | 12/2011 | Tugnawat et al. |
| 2011/0306318 A1 | 12/2011 | Rodgers et al. |
| 2011/0314129 A1 | 12/2011 | Rezaiifar et al. |
| 2012/0027059 A1 | 2/2012 | Zhao et al. |
| 2012/0030512 A1 | 2/2012 | Wadhwa et al. |
| 2012/0035989 A1 | 2/2012 | Abel et al. |
| 2012/0036282 A1 | 2/2012 | Chen et al. |
| 2012/0046022 A1 | 2/2012 | Kalke et al. |
| 2012/0047227 A1 | 2/2012 | Haggerty et al. |
| 2012/0054022 A1 | 3/2012 | Kosashvili |
| 2012/0094684 A1 | 4/2012 | Reddy |
| 2012/0106509 A1 | 5/2012 | Klingenbrunn et al. |
| 2012/0129513 A1 | 5/2012 | van der Laak |
| 2012/0129572 A1 | 5/2012 | Johnstone et al. |
| 2012/0135733 A1 | 5/2012 | Cormier et al. |
| 2012/0142314 A1 | 6/2012 | Mohammed |
| 2012/0151199 A1 | 6/2012 | Shriver |
| 2012/0158580 A1 | 6/2012 | Eram et al. |
| 2012/0203824 A1 | 8/2012 | Oommen |
| 2012/0208511 A1 | 8/2012 | Vanderlinden et al. |
| 2012/0230587 A1 | 9/2012 | Arseneau |
| 2012/0260095 A1 | 10/2012 | Von Hauck et al. |
| 2012/0276872 A1 | 11/2012 | Knauth et al. |
| 2012/0282891 A1 | 11/2012 | Mohammed et al. |
| 2012/0282924 A1 | 11/2012 | Tagg et al. |
| 2012/0309377 A1 | 12/2012 | De Atley et al. |
| 2013/0010641 A1 | 1/2013 | Dinan |
| 2013/0013671 A1 | 1/2013 | Relan et al. |
| 2013/0023235 A1 | 1/2013 | Fan et al. |
| 2013/0031191 A1 | 1/2013 | Bott |
| 2013/0031234 A1 | 1/2013 | Alfano et al. |
| 2013/0031541 A1 | 1/2013 | Wilks et al. |
| 2013/0041988 A1* | 2/2013 | Rodermund ........ H04L 41/0806 709/220 |
| 2013/0046951 A1 | 2/2013 | Jones |
| 2013/0065557 A1 | 3/2013 | Zhang et al. |
| 2013/0065578 A1 | 3/2013 | Raleigh et al. |
| 2013/0072168 A1 | 3/2013 | Colucciello et al. |
| 2013/0080911 A1 | 3/2013 | Klemm |
| 2013/0085914 A1 | 4/2013 | McPherson et al. |
| 2013/0111461 A1 | 5/2013 | Zubas et al. |
| 2013/0124186 A1 | 5/2013 | Donabedian et al. |
| 2013/0184029 A1 | 7/2013 | Lim et al. |
| 2013/0196647 A1 | 8/2013 | Raleigh et al. |
| 2013/0198567 A1 | 8/2013 | Ahmed et al. |
| 2013/0222395 A1 | 8/2013 | Blas, Jr. |
| 2013/0275560 A1 | 10/2013 | Bestmann et al. |
| 2013/0281085 A1 | 10/2013 | Sen et al. |
| 2013/0295902 A1 | 11/2013 | Justen et al. |
| 2013/0303142 A1 | 11/2013 | Burcham et al. |
| 2013/0310003 A1 | 11/2013 | Sadhvani et al. |
| 2013/0311836 A1 | 11/2013 | Hurst et al. |
| 2013/0318518 A1 | 11/2013 | Paalanen et al. |
| 2013/0326359 A1 | 12/2013 | Beckert et al. |
| 2014/0045483 A1 | 2/2014 | Whidden |
| 2014/0068779 A1 | 3/2014 | Tan et al. |
| 2014/0075567 A1 | 3/2014 | Raleigh et al. |
| 2014/0080467 A1 | 3/2014 | Urbanek |
| 2014/0099916 A1 | 4/2014 | Mallikarjunan et al. |
| 2014/0113610 A1* | 4/2014 | Ramprasad ............ G06Q 10/10 455/418 |
| 2014/0122563 A1 | 5/2014 | Singh et al. |
| 2014/0134981 A1 | 5/2014 | Park et al. |
| 2014/0140507 A1 | 5/2014 | Park et al. |
| 2014/0206313 A1 | 7/2014 | Spanel et al. |
| 2014/0228012 A1 | 8/2014 | Annan et al. |
| 2014/0228042 A1 | 8/2014 | Annan et al. |
| 2014/0274032 A1 | 9/2014 | Shipley et al. |
| 2014/0342715 A1 | 11/2014 | Gu et al. |
| 2014/0373184 A1 | 12/2014 | Mahaffey et al. |
| 2015/0011311 A1 | 1/2015 | Relan et al. |
| 2015/0017962 A1 | 1/2015 | Howard et al. |
| 2015/0033291 A1 | 1/2015 | Nicolau |
| 2015/0040246 A1 | 2/2015 | Yuen et al. |
| 2015/0065105 A1 | 3/2015 | Masterson et al. |
| 2015/0094041 A1 | 4/2015 | Jung et al. |
| 2015/0111564 A1 | 4/2015 | Urbanek |
| 2015/0111565 A1 | 4/2015 | Urbanek |
| 2015/0133094 A1* | 5/2015 | Lindeman ............ H04W 4/003 455/414.1 |
| 2015/0193217 A1 | 7/2015 | Xiang et al. |
| 2015/0220245 A1 | 8/2015 | Wojcik et al. |
| 2015/0242336 A1 | 8/2015 | Loreskar et al. |
| 2015/0304506 A1 | 10/2015 | Zhu et al. |
| 2015/0319178 A1 | 11/2015 | Desai et al. |
| 2015/0331590 A1 | 11/2015 | Yasui |
| 2015/0370428 A1 | 12/2015 | Chan et al. |
| 2016/0044091 A1 | 2/2016 | Doumet |
| 2016/0094931 A1 | 3/2016 | Urbanek |
| 2016/0234675 A1 | 8/2016 | Ghoshal et al. |
| 2016/0239317 A1 | 8/2016 | Cuddihy et al. |

FOREIGN PATENT DOCUMENTS

| | | |
|---|---|---|
| GB | 2292047 A | 2/1996 |
| JP | 5924347 B2 | 4/2015 |
| KR | 2006039974 A | 5/2006 |
| WO | WO2010135257 A1 | 11/2010 |
| WO | WO2012078753 A1 | 6/2012 |
| WO | WO2013169983 A1 | 11/2013 |
| WO | WO2014020237 A1 | 2/2014 |
| WO | WO2014046814 A1 | 3/2014 |
| WO | WO2014113128 A1 | 7/2014 |
| WO | WO2014123758 A1 | 8/2014 |
| WO | WO2014123759 A1 | 8/2014 |
| WO | WO2014158430 A1 | 9/2014 |
| WO | WO2015030945 A1 | 3/2015 |

(56) References Cited

FOREIGN PATENT DOCUMENTS

WO    WO2015060965 A2    4/2015
WO    WO2016130266 A1    8/2016

OTHER PUBLICATIONS

Notice of Allowance dated Nov. 2, 2012, U.S. Appl. No. 13/556,202, filed Jul. 24, 2012.
Notice of Allowance dated Jun. 11, 2013, U.S. Appl. No. 13/752,386, filed Jan. 28, 2013.
First Action Interview Pre-Interview Communication dated Feb. 25, 2013, U.S. Appl. No. 13/149,505, filed May 31, 2013.
First Action Interview Office Action dated May 8, 2013, U.S. Appl. No. 13/149,505, filed May 31, 2013.
Notice of Allowance dated Aug. 9, 2013, U.S. Appl. No. 13/149,505, filed May 31, 2013.
First Action Interview Pre-Interview Communication dated Aug. 13, 2013, U.S. Appl. No. 13/335,941, filed Dec. 23, 2011.
Notice of Allowance dated Oct. 9, 2013, U.S. Appl. No. 13/335,941, filed Dec. 23, 2011.
First Action Interview Pre-Interview Communication dated Apr. 23, 2014, U.S. Appl. No. 13/622,234, filed Sep. 18, 2012.
Final Office Action dated Sep. 19, 2014, U.S. Appl. No. 13/622,234, filed Sep. 18, 2012.
FAIPP Pre-Interview Communication dated Mar. 19, 2014, U.S. Appl. No. 13/744,847, filed Jan. 18, 2013.
Notice of Allowance dated Aug. 4, 2014, U.S. Appl. No. 13/744,847 filed Jan. 18, 2013.
FAIPP Pre-Interview Communication dated Jul. 16, 2014, U.S. Appl. No. 13/744,861, filed Jan. 18, 2013.
First Action Interview Pre-Interview Communication dated Apr. 3, 2014, U.S. Appl. No. 13/763,434, filed Feb. 8, 2013.
Final Office Action dated Aug. 19, 2014, U.S. Appl. No. 13/763,434, filed Feb. 8, 2013.
Office Action dated Aug. 7, 2014, U.S. Appl. No. 13/831,504, filed Mar. 14, 2013.
Foreign Communication from a Related Counterpart—International Search Report and Written Opinion, dated Feb. 29, 2012, PCT/US2011/063736, filed on Dec. 7, 2011.
Foreign Communication from a Related Counterpart Application, "Preliminary Report on Patentability", dated Jun. 20, 2013, PCT/US2011/063736 filed on Dec. 7, 2011.
Foreign Communication from a Related Counterpart—International Search Report and Written Opinion, dated Jul. 24, 2013, PCT/US13/40278, filed on May 9, 2013.
Foreign Communication from a Related Counterpart—International Search Report and Written Opinion, dated Nov. 14, 2013, PCT/US13/55023, filed on Aug. 15, 2013.
Foreign Communication From a Related Counterpart Application, International Search Report and Written Opinion dated Jan. 24, 2014, International Application No. PCT/US13/68981 filed on Nov. 7, 2013.
Foreign Communication from a Related Counterpart—International Search Report and Written Opinion, dated May 19, 2014, PCT/US14/13936, filed on Jan. 30, 2014.
Foreign Communication from a Related Counterpart—International Search Report and Written Opinion, dated May 14, 2014, PCT/US14/13939, filed on Jan. 30, 2014.
Delker, Jason R., "Loading Branded Media Outside System Partition", filed Oct. 30, 2013 U.S. Appl. No. 14/066,947.
Mauer, Brian D., et al., "Automatic Branding of Generic Applications", filed Jan. 10, 2013, U.S. Appl. No. 14/152,627.
Spanel, Robert L., et al., Patent Application entitled "Dynamic Remotely Managed SIM Profile" U.S. Appl. No. 13/744,847, filed Jan. 18, 2013.
Annan, Brandon C., et al.,"System and Method of Branding and Labeling a Mobile Device", filed Mar. 15, 2013, U.S. Appl. No. 13/844,104.
Annan, Brandon C., et al.,"Electronic Fixed Brand Labeling", filed Feb. 8, 2013, U.S. Appl. No. 13/763,443.
Ghoshal, Jagannath, et al.,"Rebranding a Portable Electronic Device While Maintaining User Data", filed May 22, 2013, U.S. Appl. No. 13/899,567.
Ghoshal, Jagannath, et al.,"System and Method for Retrofitting a Branding Framework into a Mobile Communication Device", filed May 21, 2013, U.S. Appl. No. 13/899,566.
Urbanek, Robert E., "Delivery of Branding Content and Customizations to a Mobile Communication Device", filed Oct. 23, 2013, U.S. Appl. No. 14/060,712.
Urbanek, Robert E., "Implementation of Remotely Hosted Branding Content and Customizations", filed Oct. 23, 2013, U.S. Appl. No. 14/085,474.
Urbanek, Robert E., "Subscriber Identity Module Virtualization", filed Nov. 20, 2013, U.S. Appl. No. 14/060,719.
Indurkar, Dhananjay, "System and Method of Branding a Device Independent of Device Activation", filed Jan. 24, 2014, U.S. Appl. No. 14/163,035.
Sumner, Bret D., "Directing Server Connection Based on Location Identifier", filed Aug. 15, 2013, U.S. Appl. No. 13/968,259.
Abou-El-Ella, Hassan, et al., "Segmented Customization Payload Delivery", filed Aug. 27, 2013, U.S. Appl. No. 14/010,518.
Sumner, Bret D., "Segmented Customization Package Within Distributed Server Architecture", filed Aug. 27, 2013, U.S. Appl. No. 14/010,522.
Masterson, Michelle E., et al., "Development and Testing of Payload Receipt by a Portable Electronic Device", filed Aug. 27, 2013, U.S. Appl. No. 14/010,523.
Masterson, Michelle E., et al., "System and Methods for Deferred and Remote Device Branding", filed Aug. 27, 2013, U.S. Appl. No. 14/010,524.
Masterson, Michelle E., et al., "System and Methods for Deferred and Remote Device Branding", filed Jul. 16, 2014, International Serial No. PCT/US14/46773.
Callan, Jeffery S., et al., "Delivery of Oversized Branding Elements for Customization", filed Nov. 6, 2013, U.S. Appl. No. 14/073,321.
Indurkar, Dhananjay, "Background Delivery of Device Configuration and Branding", filed Jan. 16, 2014, U.S. Appl. No. 14/157,507.
Ahn, Chul Jin, et al., "Separation of Client Identification Composition from Customization Payload to Original Equipment Manufacturer Layer", filed Nov. 8, 2013, U.S. Appl. No. 14/075,687.
Ghoshal, Jagannath, et al., "Multiple Carrier Partition Dynamic Access on a Mobile Device", filed Jun. 5, 2014, U.S. Appl. No. 14/297,429.
Indurkar, Dhananjay, "Activation Sequence Using Permission Based Connection to Network", filed Jan. 24, 2014, U.S. Appl. No. 14/163,041.
First Action Interview Pre-Interview Communication dated Sep. 22, 2014, U.S. Appl. No. 13/468,028, filed May 9, 2013.
Foreign Communication from a Related Counterpart—International Search Report and Written Opinion, dated Jun. 3, 2014,PCT/US14/16650, filed on Feb. 16, 2014.
Urbanek, Robert E., "Delivery of Branding Content and Customizations to a Mobile Communication Device", filed , 201, International Serial No. PCT/US14/56778.
First Action Interview Office Action dated Mar. 16, 2015, U.S. Appl. No. 13/468,028, filed May 9, 2013.
Office Action dated Mar. 2, 2015, U.S. Appl. No. 13/622,234, filed Sep. 18, 2012.
FAIPP Pre-Interview Communication dated Mar. 26, 2015, U.S. Appl. No. 14/522,586, filed Oct. 24, 2014.
FAIPP Pre-Interview Communication dated Apr. 8, 2015, U.S. Appl. No. 13/844,104, filed Mar. 15, 2013.
Notice of Allowance dated Mar. 20, 2015, U.S. Appl. No. 13/763,428, filed Feb. 8, 2013.
Notice of Allowance dated Mar. 26, 2015, U.S. Appl. No. 13/763,434, filed Feb. 8, 2013.
Notice of Allowance dated Jan. 22, 2015, U.S. Appl. No. 13/899,566, filed May 21, 2013.
FAIPP Pre-Interview Communication dated Apr. 15, 2015, U.S. Appl. No. 14/060,712, filed Nov. 20, 2013.

(56) References Cited

OTHER PUBLICATIONS

FAIPP Pre-Interview Communication dated Mar. 4, 2015, U.S. Appl. No. 14/010,518, filed Aug. 27, 2013.
FAIPP Pre-Interview Communication dated Apr. 1, 2015, U.S. Appl. No. 14/010,522, filed Aug. 27, 2013.
FAIPP Pre-Interview Communication dated Apr. 3, 2015, U.S. Appl. No. 14/010,523, filed Aug. 27, 2013.
FAIPP Pre-Interview Communication dated Mar. 10, 2015, U.S. Appl. No. 14/010,524, filed Aug. 27, 2013.
FAIPP Pre-Interview Communication dated Apr. 8, 2015, U.S. Appl. No. 14/157,507, filed Jan. 16, 2014.
Foreign Communication from a Related Counterpart—International Preliminary Report on Patentability, dated Apr. 2, 2015, PCT/US13/55023, filed on Aug. 15, 2013.
Delker, Jason R., et al. "Subscriber Identity Module (SIM) Card Initiation of Custom Application Launcher Installation on a Mobile Communication Device," filed Mar. 4, 2015, U.S. Appl. No. 14/639,056.
Delker, Jason R., et al. "Network Access Tiered Based on Application Launcher Installation," filed Mar. 4, 2015, U.S. Appl. No. 14/639,060.
FAIPP Pre-Interview Communication dated Mar. 12, 2015, U.S. Appl. No. 13/972,827, filed Aug. 21, 2013.
Ghoshal, Jagannath, et al., "Multi-Step Mobile Device Initiation with Intermediate Partial Reset," filed Aug. 21, 2013, U.S. Appl. No. 13/972,827.
FAIPP Pre-Interview Communication dated Jun. 2, 2015, U.S. Appl. No. 14/152,627, filed Jan. 10, 2013.
Notice of Allowance dated Jul. 7, 2015, U.S. Appl. No. 14/522,586, filed Oct. 24, 2014.
FAIPP Pre-Interview Communication dated Apr. 23, 2014, U.S. Appl. No. 13/763,443, filed Feb. 8, 2013.
First Action Interview Office Action dated Jun. 16, 2014, U.S. Appl. No. 13/763,443, filed Feb. 8, 2013.
Office Action dated Jun. 16, 2015, U.S. Appl. No. 13/899,567, filed May 22, 2013.
Notice of Allowance dated May 7, 2015, U.S. Appl. No. 13/972,827, filed Aug. 21, 2013.
Notice of Allowance dated May 29, 2015, U.S. Appl. No. 14/085,474, filed Nov. 20, 2013.
Notice of Allowance dated May 8, 2015, U.S. Appl. No. 14/010,518, filed Aug. 27, 2013.
Notice of Allowance dated Jul. 8, 2015, U.S. Appl. No. 14/010,522, filed Aug. 27, 2013.
Notice of Allowance dated Jun. 26, 2015, U.S. Appl. No. 14/010,523, filed Aug. 27, 2013.
Notice of Allowance dated Apr. 28, 2015, U.S. Appl. No. 14/010,524, filed Aug. 27, 2013.
Restriction Requirement dated May 21, 2015, U.S. Appl. No. 14/073,321, filed Nov. 6, 2013.
FAIPP Pre-Interview Communication dated Jul. 8, 2015, U.S. Appl. No. 14/475,399, filed Sep. 2, 2014.
Amazon Kindle e-book reader, on public sale 2007, http://en.wikipedia.org/wiki/Amazon_Kindle. last accessed on Apr. 13, 2015.
Final Office Action dated Nov. 4, 2015, U.S. Appl. No. 13/468,028, filed May 9, 2012.
Advisory Action dated Nov. 3, 2015, U.S. Appl. No. 13/763,443, filed Feb. 8, 2013.
Notice of Allowance dated Oct. 26, 2015, U.S. Appl. No. 13/899,567, filed May 22, 2013.
FAIPP Pre-Interview Communication dated Oct. 16, 2015, U.S. Appl. No. 14/060,712, filed Oct. 23, 2013.
FAIPP Pre-Interview Communication dated Nov. 2, 2015, U.S. Appl. No. 14/060,719, filed Oct. 23, 2013.
First Action Interview Office Action dated Dec. 14, 2015, U.S. Appl. No. 14/060,719, filed Oct. 23, 2013.
Notice of Allowance dated Nov. 4, 2015, U.S. Appl. No. 14/073,321, filed Nov. 6, 2013.
First Action Interview Office Action dated Oct. 16, 2015, U.S. Appl. No. 14/157,507, filed Jan. 16, 2014.
FAIPP Pre-Interview Communication dated Oct. 7, 2015, U.S. Appl. No. 14/075,687, filed Nov. 8, 2013.
FAIPP Pre-Interview Communication dated Nov. 19, 2015, U.S. Appl. No. 14/297,429, filed Jun. 5, 2014.
Notice of Allowance dated Dec. 4, 2015, U.S. Appl. No. 14/475,399, filed Sep. 2, 2014.
Supplemental Notice of Allowability dated Dec. 14, 2015, U.S. Appl. No. 14/475,399, filed Sep. 2, 2014.
FAIPP Pre-Interview Communication dated Nov. 4, 2015, U.S. Appl. No. 14/619,677, filed Feb. 11, 2015.
Notice of Allowance dated Dec. 11, 2015, U.S. Appl. No. 14/619,677, filed Feb. 11, 2015.
Ubanek, Robert E., "Generic Mobile Devices Customization Framework," filed Oct. 7, 2015, U.S. Appl. No. 14/877,215.
Ghoshal, Jagannath, et al., "Multi-Step Mobile Device Initiation with Intermediate Partial Reset," filed Aug. 6, 2015, U.S. Appl. No. 14/820,522.
Ghoshal, Jagannath, et al., "Dynamic Subscriber Identity Module," filed Feb. 11, 2015, U.S. Appl. No. 14/619,677.
Foreign Office Action dated Jul. 7, 2015, Japanese Application Serial No. 2013-543310, filed Jul. 7, 2015.
Notice of Allowance dated Aug. 6, 2015, U.S. Appl. No. 14/152,627, filed Jan. 10, 2013.
Notice of Allowance dated Jul. 15, 2015, U.S. Appl. No. 13/622,234, filed Sep. 18, 2012.
Notice of Allowance dated Jul. 16, 2015, U.S. Appl. No. 13/844,104, filed Mar. 15, 2013.
Final Office Action dated Aug. 10, 2015, U.S. Appl. No. 13/763,443, filed Feb. 8, 2013.
FAIPP Pre-Interview Communication dated Sep. 29, 2015, U.S. Appl. No. 14/163,035, filed Jan. 24, 2014.
FAIPP Pre-Interview Communication dated Aug. 20, 2015, U.S. Appl. No. 14/073,321, filed Nov. 6, 2013.
FAIPP Pre-Interview Communication dated Jul. 15, 2015, U.S. Appl. No. 14/163,041, filed Jan. 24, 2014.
Foreign Communication From a Related Counterpart Application, International Preliminary Report on Patentability dated Jul. 30, 2015, PCT/US13/68981, filed on Nov. 7, 2013.
Foreign Communication From a Related Counterpart Application, International Preliminary Report on Patentability dated Aug. 20, 2015, PCT/US14/13936, filed on Jan. 30, 2014.
Foreign Communication From a Related Counterpart Application, International Preliminary Report on Patentability dated Aug. 20, 2015, PCT/US14/13939, filed on Jan. 30, 2014.
Foreign Communication From a Related Counterpart Application, International Preliminary Report on Patentability dated Sep. 24, 2015, PCT/US14/16650, filed on Feb. 16, 2014.
Dummies, "Power Modes on Your Kindle Paperwhite", http://dummies.com/how-to/content/power-modes-on-your-kindle-paperwhite.html, last accessed on Jul. 31, 2015.
Cushings, "Buy Your Kindle At Waterstones? You're Now Locked Into One Sceensaver . . . The Waterstones Logo", https://www.techdirt.com/articles/20121206/16014421285/buy-your-kindle-waterstones-youre-now-locked-into-one-screensaver-waterstones-logo.shtml, last accessed Aug. 3, 2015.
Wikipedia, Extended Display Identification Data, https://en.wikipedia.org/wiki/Extended_Display_Identification_Data, last accessed Aug. 5, 2015.
Foreign Notice of Allowance dated Mar. 21, 2016, Japanese Application Serial No. 2013-543310, filed Jul. 7, 2015.
Advisory Action dated Jan. 29, 2016, U.S. Appl. No. 13/468,028, filed May 9, 2012.
Office Action dated Apr. 4, 2016, U.S. Appl. No. 13/468,028, filed May 9, 2012.
FAIPP Pre-Interview Communication dated Jan. 11, 2016, U.S. Appl. No. 14/877,215, filed Oct. 7, 2015.
FAIPP Pre-Interview Communication dated Feb. 25, 2016, U.S. Appl. No. 14/820,522, filed Aug. 6, 2015.
Final Office Action dated Mar. 9, 2016, U.S. Appl. No. 14/060,712, filed Oct. 23, 2013.

(56) References Cited

OTHER PUBLICATIONS

Final Office Action dated Feb. 24, 2016, U.S. Appl. No. 14/060,719, filed Oct. 23, 2013.
Final Office Action dated Feb. 16, 2016, U.S. Appl. No. 14/163,035, filed Jan. 24, 2014.
FAIPP Pre-Interview Communication dated Mar. 16, 2016, U.S. Appl. No. 13/968,259, filed Aug. 15, 2013.
Notice of Allowance dated Feb. 25, 2016, U.S. Appl. No. 14/157,507, filed Jan. 16, 2014.
Notice of Allowance dated Jan. 27, 2016, U.S. Appl. No. 14/075,687, filed Nov. 8, 2013.
First Action Interview Office Action dated Feb. 2, 2016, U.S. Appl. No. 14/297,429, filed Jun. 5, 2014.
Final Office Action dated Jan. 12, 2016, U.S. Appl. No. 14/163,041, filed Jan. 24, 2014.
Notice of Allowance dated Feb. 3, 2016, U.S. Appl. No. 14/639,056, filed Mar. 4, 2015.
Notice of Allowance dated Mar. 11, 2016, U.S. Appl. No. 14/639,060, filed Mar. 4, 2015.
Foreign Communication from a Related Counterpart—International Preliminary Report on Patentability, dated Mar. 10, 2016, PCT/US14/46773, filed on Jul. 16, 2014.
Foreign Communication from a Related Counterpart—International Search Report and Written Opinion, dated Apr. 4, 2016, PCT/US16/13272, filed on Jan. 13, 2016.
Goshal, Jagannath, et al., "Dynamic Subscriber Identity Module," filed Jan. 13, 2016, International Serial No. PCT/US16/13272.
Goshal, Jagannath, et al., "Dynamic Subscriber Identity Module," filed Mar. 7, 2016, U.S. Appl. No. 15/063,383.
Notice of Allowance dated Apr. 13, 2016, U.S. Appl. No. 14/877,215, filed Oct. 7, 2015.
EP Search Report dated May 17, 2016, European Application No. 14749499.1, filed on Feb. 8, 2013.
Office Action dated May 3, 2016, U.S. Appl. No. 13/763,443, filed Feb. 8, 2013.
Notice of Allowance dated May 6, 2016, U.S. Appl. No. 14/820,522, filed Aug. 6, 2015.
Advisory Action dated May 3, 2016, U.S. Appl. No. 14/060,712, filed Oct. 23, 2013.
Advisory Action dated Apr. 20, 2016, U.S. Appl. No. 14/060,719, filed Oct. 23, 2013.
Office Action dated Jun. 6, 2016, U.S. Appl. No. 14/060,719, filed Oct. 23, 2013.
Office Action dated May 10, 2016, U.S. Appl. No. 14/163,035, filed Jan. 24, 2014.
Final Office Action dated Jun. 14, 2016, U.S. Appl. No. 13/968,259, filed Aug. 15, 2013.
Notice of Allowance dated Apr. 20, 2016, U.S. Appl. No. 14/297,429, filed Jun. 5, 2014.
Notice of Allowance dated Apr. 13, 2016, U.S. Appl. No. 14/163,041, filed Jan. 24, 2014.
Benjamin, Jeff, "Flow to change your iPhone carrier logo without jailbreaking," idownloadblog.com, Dec. 31, 2012.
Wikipedia, "Motorola Fone," Mar. 21, 2016.
Mobile Gazette, Motorola Fone F3 Review, www.mobilegazette.com, Sep. 16, 2007.
Delker, Jason R., et al. "Network Access Tiered Based on Application Launcher Installation," filed May 25, 2016, U.S. Appl. No. 15/164,530.
EP Search Report dated Jul. 7, 2016, European Application Serial No. 13871478.7 filed on Jan. 18, 2013.
EP Search Report dated Aug. 24, 2015, European Application Serial No. 14749462.9, filed on Feb. 8, 2013.
Notice of Allowance dated Sep. 12, 2016, U.S. Appl. No. 13/763,443, filed Feb. 8, 2013.
Notice of Allowance dated Aug. 18, 2016, U.S. Appl. No. 13/968,259, filed Aug. 15, 2013.
Yota Devices, "Hands-on with the YotaPhone: the e-ink Android phone that nobody expected," New York Times, 2010.
Ghoshal, Jagannath, et al., "System and Method of Mobile Phone Customization Based on Universal Manifest with Feature Override," filed Sep. 16, 2016, U.S. Appl. No. 15/268,347.
Ghoshal, Jagannath, et al., "System and Method of Mobile Phone Customization Based on Universal Manifest," filed Sep. 14, 2016, U.S. Appl. No. 15/265,833.
EP Search Report dated Oct. 12, 2016, EP International Application No. 11847301.6, filed on Jun. 20, 2013.
Final Office Action dated Oct. 26, 2016, U.S. Appl. No. 13/468,028, filed May 9, 2012.
Office Action dated Dec. 29, 2016, U.S. Appl. No. 14/060,712, filed Oct. 23, 2013.
Notice of Allowance dated Nov. 2, 2016, U.S. Appl. No. 14/163,035, filed Jan. 24, 2014.
FAIPP Pre-Interview Communication dated Nov. 4, 2016, U.S. Appl. No. 14/530,666, filed Oct. 31, 2014.
Advisory Action dated Dec. 17, 2014, U.S. Appl. No. 13/622,234, filed Sep. 18, 2012.
Notice of Allowance dated Nov. 22, 2014, U.S. Appl. No. 13/744,861, filed Jan. 18, 2013.
First Action Interview Pre-Interview Communication dated Oct. 22, 2014, U.S. Appl. No. 13/763,428, filed Feb. 8, 2013.
Notice of Allowance dated Dec. 29, 2014, U.S. Appl. No. 13/831,504, filed Mar. 14, 2013.
First Action Interview Pre-Interview Communication dated Nov. 20, 2014, filed on May 21, 2013.
Foreign Communication from a Related Counterpart Application, "Preliminary Report on Patentability," dated Nov. 20, 2014, PCT/US13/40278 filed on May 9, 2013.
Foreign Communication from a Related Counterpart—International Search Report and Written Opinion, dated Dec. 17, 2014, PCT/US14/46773, filed on Jul. 16, 2014.
Foreign Communication from a Related Counterpart—International Search Report and Written Opinion, dated Dec. 30, 2014, PCT/US14/56778, filed Sep. 22, 2014.
Spanel, Robert L., et al., Patent Application entitled "Dynamic Remotely Managed SIM Profile" U.S. Appl. No. 14/522,586, filed Oct. 24, 2014.
Urbanek, Robert E, "Delivery of Branding Content and Customizations to a Mobile Communication Device", filed Sep. 22, 2014, International Serial No. PCT/US14/56778.
Koller, Gary D., et al., "Out of the Box Experience (OOBE) Country Choice Using Wi-Fi Layer Transmission," filed Oct. 31, 2014, U.S. Appl. No. 14/530,666.
Blinn, Benjamin P., et al. "System and Method of Efficient Mobile Device Network Brand Customization," filed Sep. 2, 2014, U.S. Appl. No. 14/475,399.
Japanese Office Action dated Apr. 13, 2017, JP Application Serial No. 2015-531933; filed on Feb. 16, 2015.
Notice of Allowance dated Apr. 17, 2017, U.S. Appl. No. 14/060,712, filed Oct. 23, 2013.
Final Office Action dated Jan. 26, 2017, U.S. Appl. No. 14/060,719, filed Oct. 23, 2013.
Advisory Action dated Mar. 24, 2017, U.S. Appl. No. 14/060,719, filed Oct. 23, 2013.
FAIPP Office Action dated Jan. 31, 2017, U.S. Appl. No. 14/530,666, filed Oct. 31, 2014.
FAIPP Pre-Interview Communication dated Apr. 10, 2017, U.S. Appl. No. 15/164,530, filed May 25, 2016.

* cited by examiner

CUSTOMIZATION FOR PRELOADED APPLICATIONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices that are used for mobile voice and/or data communications based on wireless network connectivity, which can be provided by base stations known as cell towers or sites. Such electronic devices may be associated with an electronic serial number (ESN), a stock keeping unit (SKU) number, and other identifying information. Mobile telephones and similar electronic/communications devices may be packaged with operating manuals, warning documents, charging devices, and other accessories in a point-of-sale package suitable for distributing to end users. A plurality of point-of-sale packages, each containing an electronic device, may be shipped together to a retail store or business location. Electronic devices may be configured prior to shipping with unique packaging, hardware and software branding, features and functionality.

SUMMARY

In an embodiment, a mobile communication device is disclosed. The mobile communication device comprises a processor, a memory, and an application stored in the memory that, when executed by the processor, parses an open mobile alliance (OMA) device management (DM) tree comprising a node that identifies a matrix, wherein the matrix comprises columns indexed by a brand identity, and rows indexed by a service identity, wherein the matrix cells store configuration values and wherein some configuration values are function calls, based on a brand identity of the mobile communication device, selects an entry of the matrix, and based on the selected entry, configures a preloaded application stored in the memory, whereby the mobile communication device may be configured remotely through a rule-based mechanism.

In an embodiment, a method of managing preloaded applications for different brands of a mobile communication device with an open mobile alliance (OMA) device management (DM) node is disclosed. The method comprises receiving an OMA DM tree from an OMA DM server in an OMA DM payload by a mobile communication device, wherein a node for preloaded applications on the OMA DM tree references a file with a data structure of a matrix form, and parsing the OMA DM tree by the mobile communication device. The method further comprises configuring preloaded applications on the mobile communication device based on the matrix, wherein the matrix comprises columns indexed by a brand identity, and rows indexed by a service identity, wherein the matrix cells store configuration values, whereby the mobile communication device may be configured remotely through a rule-based mechanism.

In an embodiment, a method of managing preloaded applications for different brands of a mobile device with an over-the-air mobile device update node is disclosed. The method comprises receiving an over-the-air mobile device update tree from an over-the-air mobile device update framework server in an over-the-air mobile device update payload by a mobile device, wherein a node on the over-the-air mobile device update tree references a function call, and parsing the over-the-air mobile device update tree by the mobile device. The method further comprises configuring preloaded applications on the mobile device based on the over-the-air mobile device update node, and invoking one or more of the functions based on at least the identity of the brand.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
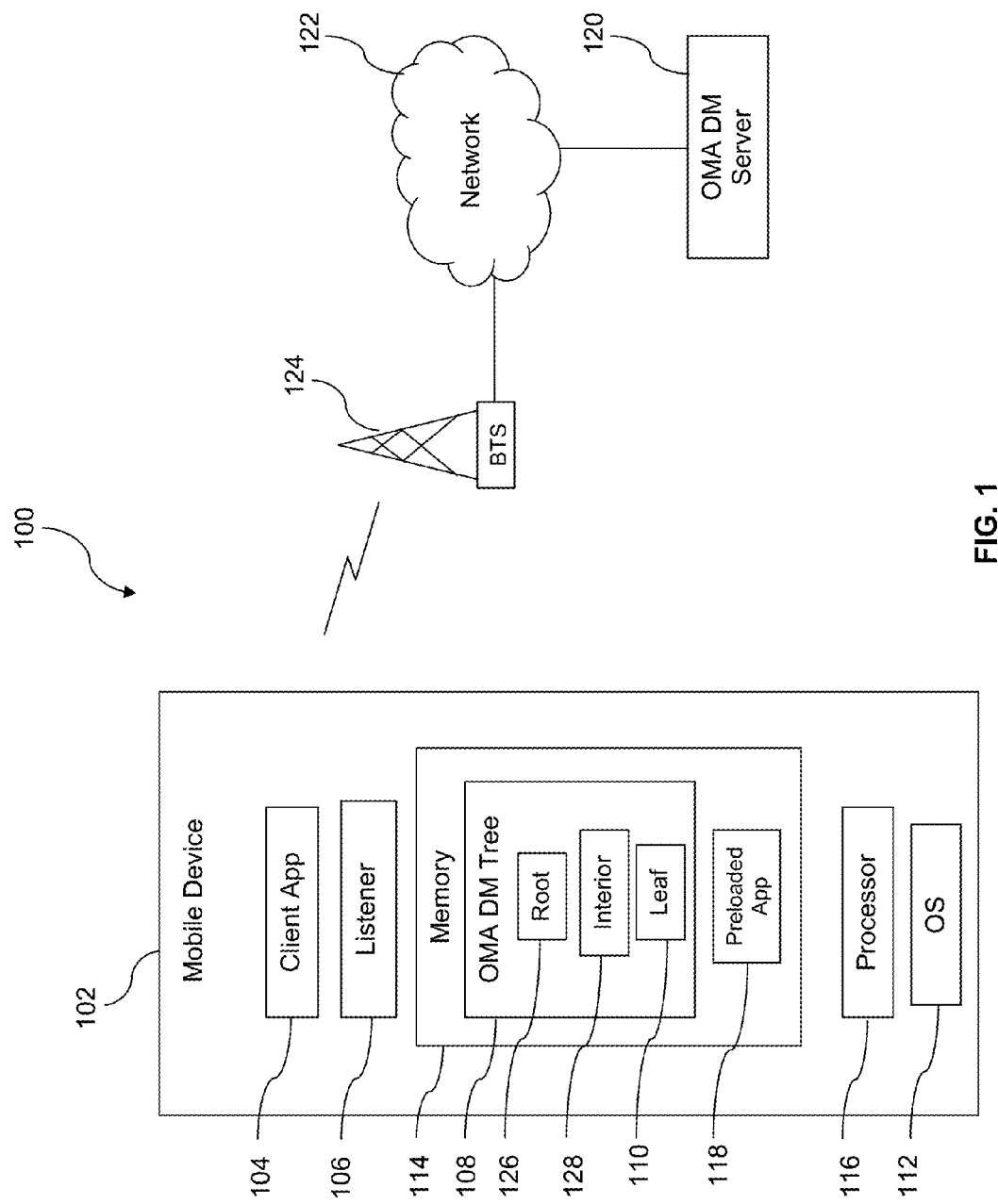
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Open mobile alliance (OMA) device management (DM) protocol may be utilized for provisioning, configuration of a device, software upgrades, firmware updates, fault management, or another device management feature for a mobile communication device. An OMA DM tree is created and maintained on the mobile communication device to store data for the OMA DM protocol. However, nodes of the OMA DM tree are fixed and not flexible to change. For example, if an OMA DM tree has three OMA DM nodes, only three applications may be supported. Adding or deleting OMA DM nodes may not be feasible or may be troublesome, for example changes may be overseen and controlled by a working group and may take one or more months to put into effect. Disclosed herein is a system and method for device management based on an OMA DM node that comprises or references a matrix for preloaded applications.

For example, an OMA DM tree may be delivered to a mobile communication device in an OMA DM payload. An OMA DM node of the OMA DM tree for preloaded applications may reference a file with a data structure of a matrix form. The matrix may be indexed with brand and service identities. The columns of the matrix may be indexed with brand identities, and the rows of the matrix may be indexed with service identities. Each cell of the matrix may store a configuration value. When the OMA DM tree is parsed and applied, the preloaded applications on the mobile communication device may be configured with the OMA DM node that references the matrix. For example, when a mobile communication device is activated or initialized for the first time, a brand identity may be selected for the mobile communication device based on predefined rules. Based on the brand identity, the mobile communication device is configured based on the contents of that brand identity column of the matrix.

Some configuration values may reference function calls. For example, a corresponding function may be invoked based on the brand identity and service identity when the configuration value references a function call. For example, "enable", "disable", or "delete" may be configuration values of the matrix cells. Applying a matrix cell with a configuration value of "enable" may enable a preloaded application or resume a paused/halted/stopped process of a preloaded application for a corresponding brand of the cell. Applying a matrix cell with a configuration value of "disable" may disable a preloaded application or pause/halt/stop a running process of a preloaded application for a corresponding brand of the cell. Applying a matrix cell with a configuration value of "delete" may delete a preloaded application for a corresponding brand of the cell. Thus, configuring preloaded applications is promoted with easier operability by the OMA DM node.

Also, it is feasible to add, delete, or change a brand, a service, or a cell in the matrix without changing the OMA DM tree definition. Thus, the matrix is beneficial for managing the amount of memory occupied by the preloaded applications. Further, the matrix can be changed and effect changes in the provisioning process of the mobile communication device without having to work through a standards working group and/or standards body. For example, a column, a row, or a cell of the matrix may be added, edited, or deleted without changing the OMA DM tree definition which may otherwise be controlled by a working group and may take one or more months to put into effect.

Turning now to FIG. 1, a communication system 100 is described. In an embodiment, the system 100 comprises a plurality of mobile communication devices 102. The mobile communication device 102 may comprise a client application 104, a listener application 106, an operating system 112, a memory 114, and a processor 116. The memory 114 comprises an open mobile alliance (OMA) device management (DM) tree 108 and preloaded applications 118. The OMA DM tree 108 comprises a root node 126, at least one interior node 128, and at least one OMA DM node, for example an OMA DM leaf node 110. The mobile communication device 102 is configured to use a cellular radio transceiver to establish a wireless communication link with a base transceiver station (BTS) 124, and the base transceiver station 124 provides communications connectivity of the mobile communication device 102 to a network 122. An OMA DM server 120 may also have access to the network 122. The network 122 may comprise any combination of private and public networks.

It is understood that the system 100 may comprise any number of mobile communication devices 102, any number of base transceiver stations 124, and any number of OMA DM servers 120. The collectivity of base transceiver stations 124 may be said to comprise a radio access network, in that these base transceiver stations 124 may provide radio communication links to the mobile communication devices 102 to provide access to the network 122. The radio access network may be abstracted in different ways and may comprise, in addition to the base transceiver stations 124, servers and data stores such as home location registers (HLRs) or servers that implement the functionality of home location registers, visitor location registers (VLRs) or servers that implement the functionality of visitor location registers, base station controllers (BSCs), mobile switching centers (MSCs), and other network nodes that are specifically associated with providing wireless access and connectivity to the mobile communication devices 102.

The cellular radio transceiver of the mobile communication device 102 may communicate with the base transceiver station 124 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol. The mobile communication device 102 may be any of a laptop computer, a notebook computer, a tablet computer, a mobile phone, a personal digital assistant (PDA), a media player, or another mobile communication device. In an embodiment, the mobile communication device 102 may have other components (not shown) such as a cellular radio transceiver, a near field communication (NFC) radio transceiver, a wireless local area network (WLAN) radio transceiver, or other components.

OMA DM is a device management protocol that is designed to promote ease of management of mobile communication devices, for example a mobile phone or a personal digital assistant. The OMA DM is intended to support provisioning, configuration of device, software upgrades, firmware updates, fault management, or another device management feature. An OMA DM server 120 may communicate with a mobile communication device 102 with a sequence of messages after identification validation. The OMA DM server 120 may send the server name to the mobile communication device 102 when initiating an OMA DM session so that the mobile communication device 102 may reply to the OMA DM server 120 that initiated the OMA DM session. In an embodiment, the division of OMA DM servers 120 may be from a logical perspective. For example, an OMA DM server 120 may be an instance of an OMA DM software application, and one physical computer may run multiple OMA DM software application instances.

In an embodiment, the client application 104 may be an OMA DM client application on the mobile communication device 102 and may communicate with the OMA DM server 120 after identification authentication or validation. The communication between the client application 104 and the OMA DM server 120 may be initiated by the client application 104, by the OMA DM server 120, or by a server other than the OMA DM server 120, with a short message service (SMS) message. For example, when the client application 104 sends a request to the OMA DM server 120, an OMA DM session is initiated. Alternatively, when a server sends a notification to the mobile communication device 102 for an OMA DM payload and the client application 104 requests the OMA DM payload from the OMA DM server 120, an OMA DM session is initiated.

Once the communication is initiated, and a communication session is established between the client application 104 and the OMA DM server 120, a sequence of messages may be exchanged to accomplish a device management task. Besides conducting the communication between the client application 104 and the OMA DM server 120, the client application 104 may execute commands from the OMA DM server 120. For example, if a binary installation file for a program is transmitted to the mobile communication device 102, the client application 104 may install the binary program. As another example, the client application 104 may receive requests from the OMA DM server 120 on the OMA DM tree of the mobile communication device 102 and reply to the OMA DM server 120 with the requested information. The client application 104 may receive a command from the OMA DM server 120 for updating the OMA DM tree 108 and may implement the command by updating the OMA DM tree 108 according to the command. In addition, the client application 104 may return results of executing commands to the OMA DM server 120 via a reply short message service message.

The listener application 106 from the operating system 112 of the mobile communication device 102 is a program application or computer program that may monitor the OMA DM tree 108 and take actions when the OMA DM tree 108 is first created or a change is made to the OMA DM tree 108. For example, when an OMA DM node 126, 128, or 110 on the OMA DM tree 108 is updated either by the OMA DM server 120 or the OMA DM client application 104, the listener application 106 may detect the update and apply the update. For example, when a file with a data structure of a matrix form is added to an OMA DM node 126, 128, or 110, the listener application 106 may detect the update, obtain the file, interpret the file, and apply the file.

Preloaded applications 118 are applications that may be dormant or inactive initially and that are completely or partially preinstalled in the memory 114 of the mobile communication device 102 before activation of the mobile communication device 102 by a user. Some preloaded applications 118 may load automatically during initialization of a mobile communication device 102 while others may remain dormant after the initialization of the mobile communication device 102. For example, the preloaded applications 118 may be installed on the mobile communication device 102 by an original equipment manufacturer (OEM) or a wireless communications service provider before the mobile communication device 102 is sold to a user. When the mobile communication device 102 first boots up and is in the process of initialization, the preloaded application 118 on the mobile communication device 102 may load automatically. Provisioning may be applied after the first boot/initialization completes. For example, the OMA DM tree 108 may be applied after the initialization of the mobile communication device 102. An OMA DM leaf node 110 in the OMA DM tree 108 may be configured to disable a corresponding preloaded application 118 after the automatic loading of the preloaded application 118 during initialization. Also, the corresponding OMA DM node leaf 110 may be configured as "enable" so that the preloaded application 118 may continue to run after the application of the OMA DM tree 108.

The OMA DM tree 108 may organize data of the OMA DM protocol in a hierarchical tree structure. The OMA DM tree 108 comprises OMA DM nodes 126, 128, or 110. An OMA DM node 126, 128, or 110 is an entity that may be manipulated by management actions carried over the OMA DM protocol. Each OMA DM node 126, 128, or 110 on the OMA DM tree 108 may have an address to be addressed with, for example a uniform resource identifier (URI). The OMA DM nodes may comprise a root node 126, interior nodes 128, and leaf nodes 110. The leaf nodes 110 may hold the data. The root 126 and interior nodes 128 may structure the data and address the data with the uniform resource identifier.

The OMA DM tree 108 may be populated at the time of provisioning after the first boot/initialization of the mobile communication device 102, for example when the mobile communication device 102 is made usable with the network 122. The OMA DM tree 108 may be populated by the OMA DM server 120 or the OMA DM client application 104. The OMA DM tree 108 may be updated by the OMA DM server 120 or the mobile communication device 102. For example, the OMA DM tree 108 may be extended by the mobile communication device 102 by user input, by attaching an accessory to the mobile communication device 102, or in another way. The OMA DM tree 108 or updates to the OMA DM tree 108 may be delivered by the client application 104.

An OMA DM leaf node 110 may contain data in a variety of forms, for example an integer, texts/characters, a file/American standard code for information interchange (ASCII), or another form. For example, an OMA DM leaf node 110 may contain data as an integer. As another example, an OMA DM leaf node 110 may comprise or reference a background picture or a screen saver. In an embodiment, the OMA DM leaf node 110 may reference a file with a data structure of a matrix form. The matrix may comprise columns indexed by a brand identity. Here the brand may refer to the wireless communication service provider or the carrier. For example, brand 1, brand 2, and brand 3 may index column 1, column 2, and column 3 of the matrix respectively. The matrix may comprise rows indexed by a service identity. A service identity may refer to a preloaded application or a process of the preloaded application herein. For example, when an instance of a preloaded application that is referred to by a service identity is running, the process may be referred to with the same service identity that refers to the preloaded application. For example, service 1, service 2, and service 3 may index row 1, row 2, and row 3 of the matrix respectively. The matrix referenced by an OMA DM leaf node 110 may be utilized to configure more than one brand and more than one application/process, and thus is more efficient than the existing mechanism where one OMA DM node may configure only one application.

Cells of the matrix may store configuration values. Configuration values may be in a variety of forms, for example integers, Booleans, function calls, or another form. Each configuration value may be used to set the value of a corresponding application or process for a corresponding brand in a provisioning profile of the mobile communication device 102. For example, by applying the configuration value of a cell that references a function call, a corresponding function may be invoked based on the brand identity of the cell. For example, "enable", "disable", or "delete" may be configuration values of the matrix cells. Applying a matrix cell with a configuration value of "enable" may enable a preloaded application or resume a paused/halted/stopped process of a preloaded application for a corresponding brand of the cell. Applying a matrix cell with a configuration value of "disable" may disable a preloaded application or pause/halt/stop a running process of a preloaded application for a corresponding brand of the cell. Applying a matrix cell with a configuration value of "delete" may delete a preloaded application for a corresponding brand of the cell.

For example, the mobile communication device 102 may be branded with any of brand 1, brand 2, or brand 3, and the brand may be determined during the initialization or customization of the mobile communication device 102. The brand of the mobile communication device 102 may be changed in predefined circumstances. For example, the mobile communication device 102 may be recognized as a brand 1 mobile communication device 102 during the initialization or activation of the mobile communication device 102. Then the brand 1 column may be selected, and cells of the brand 1 column may be used to configure the services. Service 1, service 2, and service 3 may be configured according to the configuration values of the according selected cells for service 1, service 2, and service 3. Additionally, the matrix is feasible for any change, for example to add, edit, or delete a brand, a service, or a cell. For example, a column, a row, or a cell of the matrix may be added, edited, or deleted without changing the OMA DM tree definition which may be controlled by a working group and may take one or more months to put into effect.

Each brand may have different configuration values for the same service, and the listener application 106 may execute the corresponding configuration value for each brand. For example, for a first brand, the listener application 106 may enable a first service, disable a second service, and delete a third service. For a second brand, the listener application may disable the first service, delete the second service, and enable the third service. A system-level flag may be set in the configuration settings of the operating system 112 to retain the provisioning status, for example the enabling/disabling status, of a preloaded application 118 during a power off process of the mobile communication device 102. Thus, when the mobile communication device 102 is powered on after a power off process, the retained provisioning status of the preloaded application 118 may be used for the preloaded application 118, for example to enable/disable the preloaded application 118.

When an OMA DM node 126, 128, or 110 is detected for the first time or is detected to be updated by the listener application 106, the listener application 106 may apply the updated OMA DM node 126, 128, or 110 accordingly. For example, during the first boot of the mobile communication device 102, the listener application 106 may detect the newly populated OMA DM tree 108, parse the OMA DM nodes 126, 128, or 110, and apply the configuration values of the OMA DM leaf nodes 110. For example, after the listener application 106 receives a boot_completed intent during the first boot of the mobile communication device 102, the listener application 106 may apply the configuration values stored in the OMA DM leaf node 110. The boot_completed intent is an event signal sent from the operating system 112 to registered applications on the mobile communication device 102 after boot is completed. Additionally, when the OMA DM node 126, 128, or 110 is updated by the OMA DM server 120 or the mobile communication device 102, the listener application 106 may detect the update to the OMA DM node 126, 120, or 110, parse the updated OMA DM node 126, 128, or 110, and apply the updated configuration value of the OMA DM leaf node 110 to corresponding entities.

Figure 2:
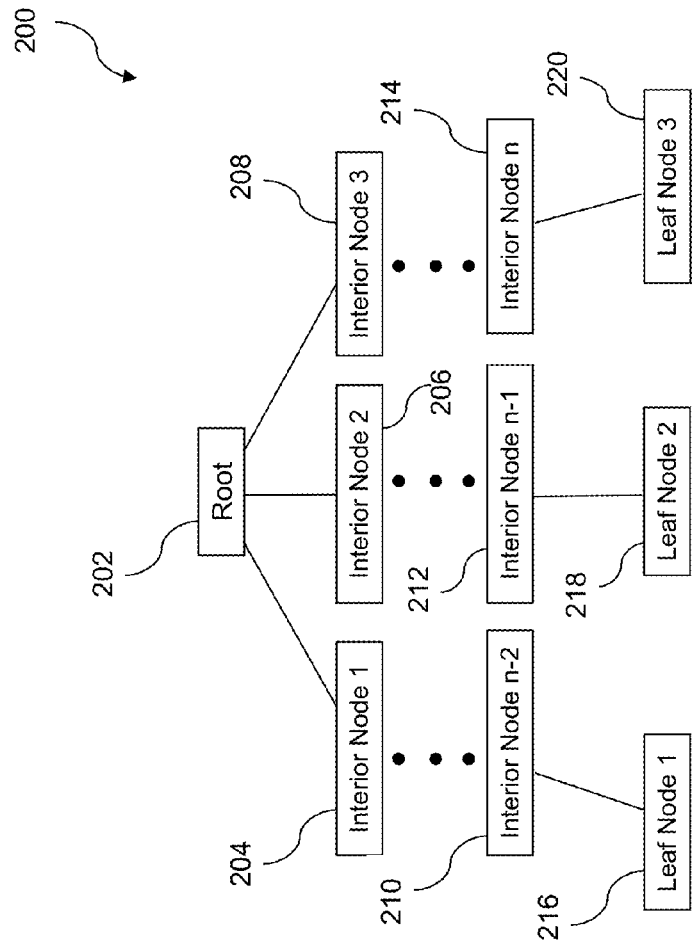
FIG. 2 is an illustration of a device management tree according to an embodiment of the disclosure.

Turning now to FIG. 2, a tree structure 200 is described. In an embodiment, an OMA DM tree 200 comprises OMA DM nodes 202-220. The OMA DM nodes are entities that may be manipulated by management actions carried over the OMA DM protocol. The OMA DM nodes may be classified into three different types: a root node 202, interior nodes 204-214, and leaf nodes 216-220. The leaf nodes 216-220 may store data for the OMA DM protocol. The root node 202 and interior nodes 204-214 may structure the data and address the data with addresses, for example the uniform resource identifier. The interior nodes 204-214 may have child nodes while a leaf node 216-220 may have no child node. It should be noted that although 10 nodes are shown in FIG. 2, any number more than three of the nodes may be structured in a hierarchical tree structure to form an OMA DM tree 200. It should also be noted that although the interior nodes 210-214 each has one child leaf node, the leaf nodes 216-220, in FIG. 2, an interior node 204-214 may have more than one child leaf node.

Figure 3:
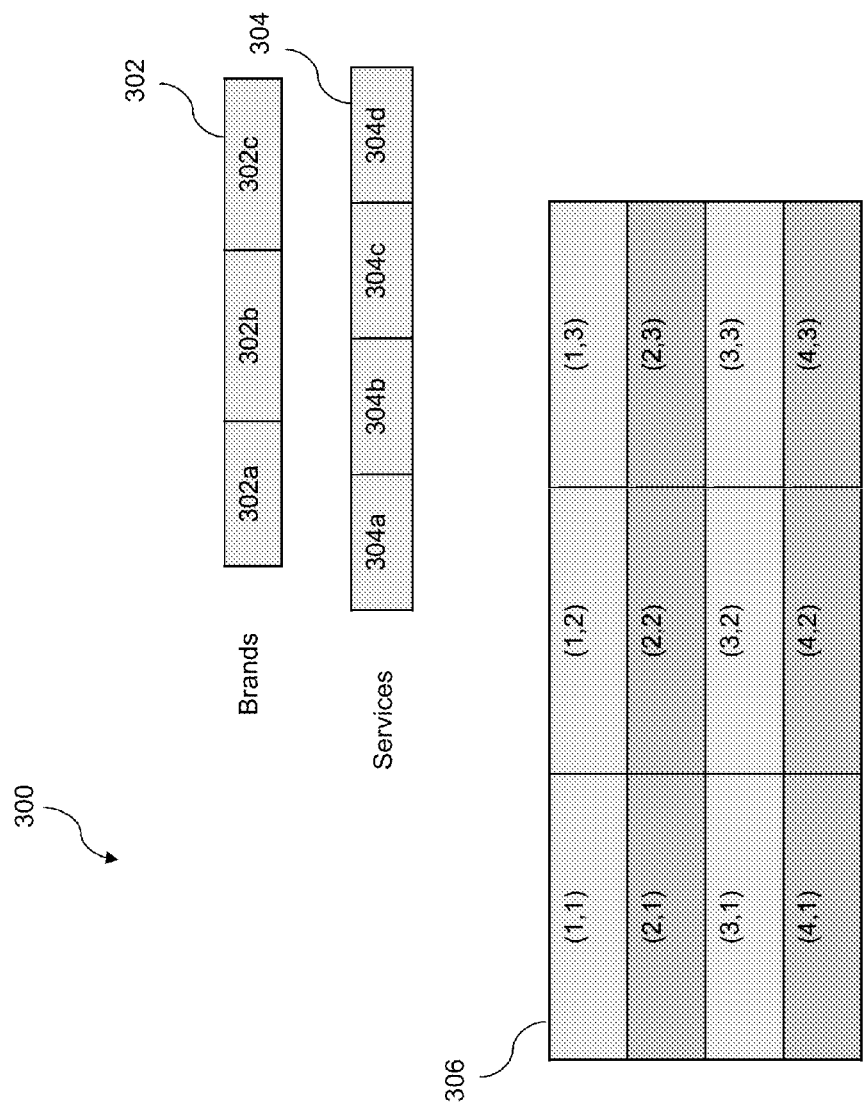
FIG. 3 is an illustration of a device management matrix according to an embodiment of the disclosure.

Turning now to FIG. 3, a matrix structure 300 is described. In an embodiment, a file referenced by an OMA DM node with a data structure of a matrix form may be indexed by brand identities and service identities. For example, rows of the matrix may be indexed by service identities and columns of the matrix may be indexed by brand identities. Alternatively, rows of the matrix may be indexed by brand identities and columns of the matrix may be indexed by service identities. For example, a first vector 302 comprising brand identities may be generated. For example, brand 1-3 may be three different brand identities. 302a may store brand identity 1, 302b may store brand identity 2, and 302c may store brand identity 3. A second vector 304 comprising service identities may also be generated. For example, service 1-4 identities may refer to four different applications or processes of applications. 304a may store service identity 1, 304b may store service identity 2, 304c may store service identity 3, and 304d may store service identity 4. In other embodiments, the matrix may be generated in other ways.

A matrix 306 may be indexed by the brands and services in vectors 302 and 304. For example, rows of the matrix 306 may be indexed by the service identities in vector 304. For example, row 1 may be indexed by service 1 identity as with 304a, row 2 may be indexed by service identity 2 as with 304b, row 3 may be indexed by service identity 3 as with 304c, and row 4 may be indexed by service identity 4 as with 304d. Columns of the matrix 306 may be indexed by brand identities in vector 302. For example, column 1 may be indexed by brand identity 1 as with 302a, column 2 may be indexed by brand identity 2 as with 302b, column 3 may be indexed by brand identity 3 as with 302c.

Thus, a cell of the matrix 306 may be indexed by a row identity and a column identity, in this case, a service identity and a brand identity. For example, if (m,n) is used to denote a coordinate of a cell, wherein m denotes a row number and n denotes a column number. Both the row number and column number may start from 1. The row number increases from the top to the bottom, and the column number increases from the left to the right, as shown in FIG. 3. Cell (2,3) may be indexed by service identity 2 and brand identity 3. The cells of the matrix 306 may store configuration values. For example, cell (2,3) may store "delete". When the cell (2,3) is applied by the listener application, service identity 2 of brand identity 3 may be deleted.

The same service identity row may store different configuration values for different brand identities. For example, service identity 1 may be an electronic wallet application, brand identity 1 may be Sprint, and brand identity 2 may be Boost mobile. The electronic wallet application may be enabled for Sprint but disabled for Boost mobile since with Sprint the mobile communication device 102 may be a contract device and with Boost mobile the mobile communication device 102 may be a prepaid device.

Figure 4:
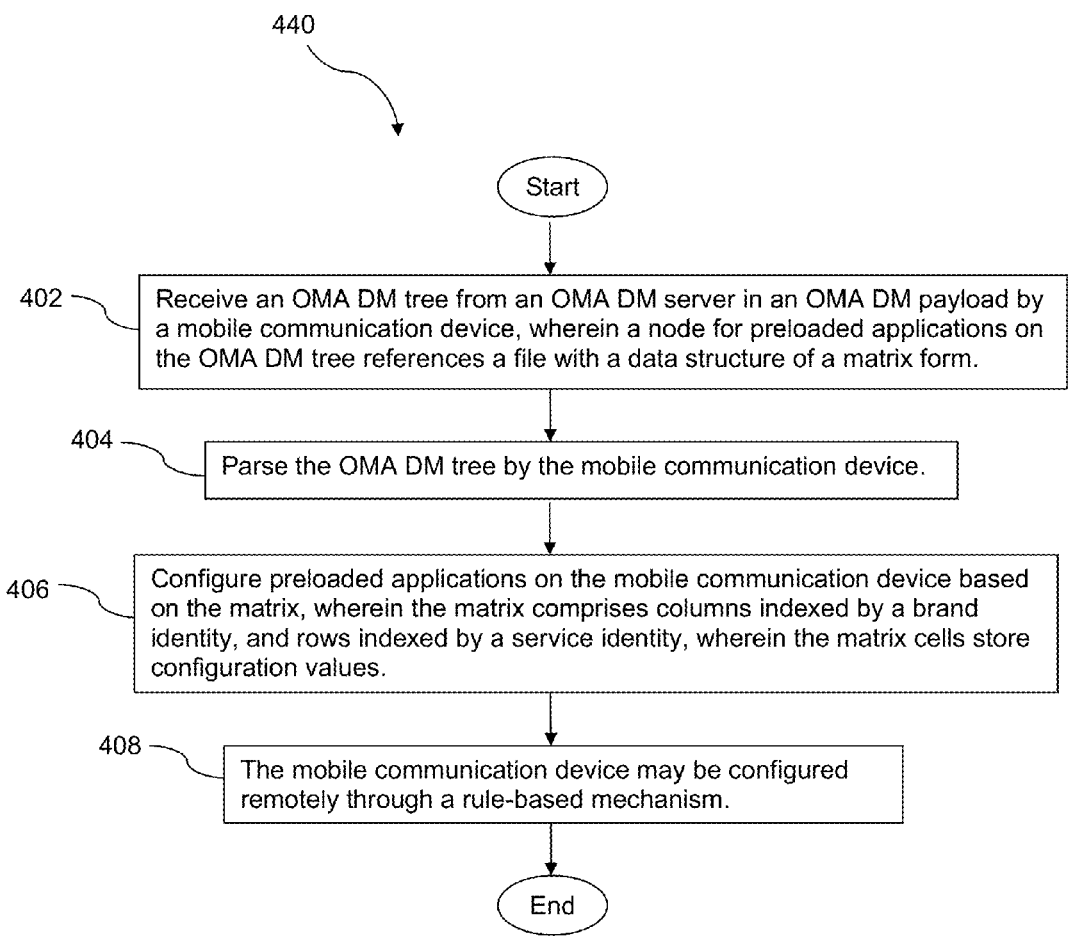
FIG. 4 is a flow chart illustrating a method according to an embodiment of the disclosure.

Turning now to FIG. 4, a method 440 is described. At block 402, an OMA DM tree from an OMA DM server is received in an OMA DM payload by a mobile communication device, wherein a node for preloaded applications on the OMA DM tree references a file with a data structure of a matrix form. For example, the OMA DM tree 108 is received in an OMA DM payload by the mobile communication device 102. In an embodiment, an OMA DM node 110 may refer to a file with a data structure of a matrix form for preloaded applications 118. At block 404, the OMA DM tree is parsed by the mobile communication device. For example, the OMA DM tree 108 may be parsed by the listener application 106 of the mobile communication device 102.

At block 406, preloaded applications on the mobile communication device are configured based on the matrix, wherein the matrix comprises columns indexed by a brand identity, and rows indexed by a service identity, wherein the matrix cells store configuration values. For example, the mobile communication device 102 may be provisioned with the OMA DM tree 108. Specifically, the preloaded applications 118 may be configured based on the matrix. The columns of the matrix may be indexed by a brand identity and the rows of the matrix may be indexed by a service identity. The cells of the matrix may store configuration values and the configuration values may be applied to configure the preloaded applications 118 on the mobile communication device 102. For example, based on pre-defined rules the brand of the mobile communication device 102 may be determined, and the column of the matrix corresponding to the brand identity may be selected. Then the mobile communication device 102 may be configured based on the cells of the selected brand identity column in the matrix. An iterative process may be used to configure the preloaded applications on the mobile communication device 102. For example, for service identity 1, the column with the corresponding brand identity may be selected and action may be taken based on the selected matrix cell. For service identity 2, the column with the corresponding brand identity may be selected and action may be taken based on the selected matrix cell. The iteration may continue until it finishes configuring the last service identity of the matrix.

At block 408, the mobile communication device may be configured remotely through a rule-based mechanism. For example, the mobile communication device 102 may be configured remotely based on the matrix. The matrix may be updated by a remote server, for example the OMA DM server 120, and at least part of the mobile communication device 102 may be reconfigured based on the updated matrix.

Figure 5:
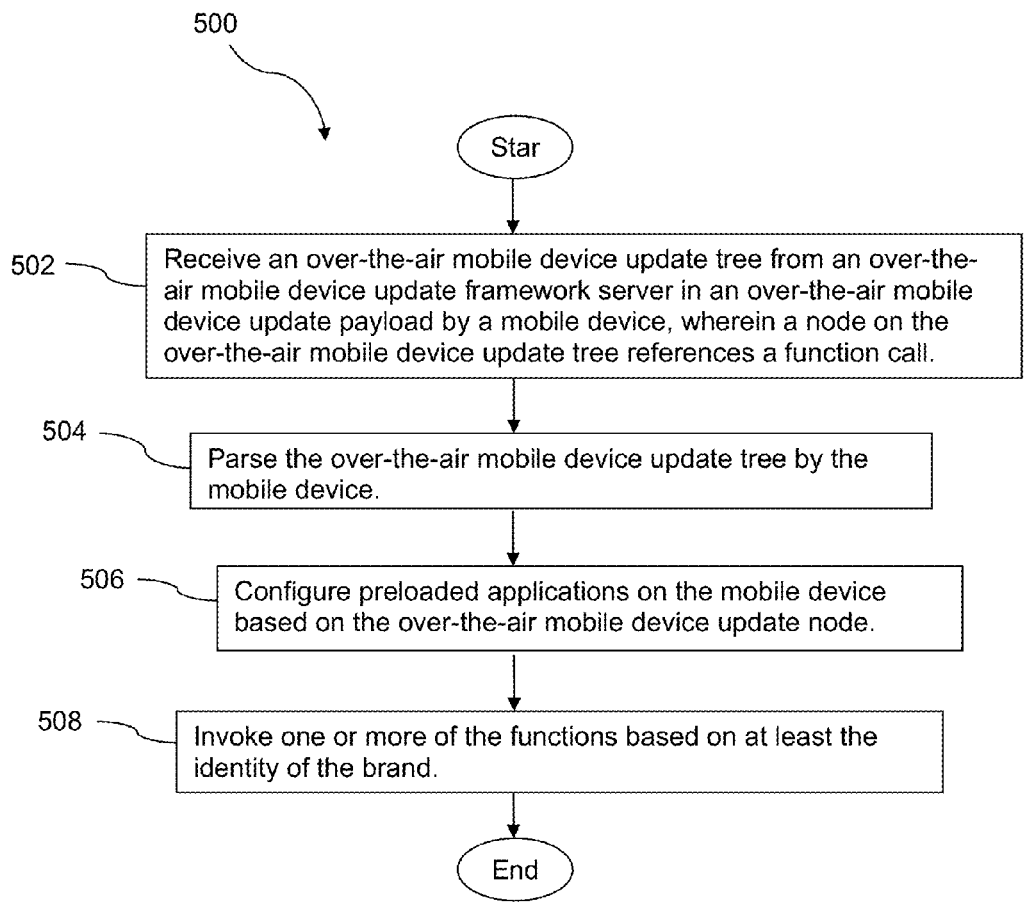
FIG. 5 is a flow chart illustrating another method according to an embodiment of the disclosure.

FIG. 5 depicts a method 500. At block 502, an over-the-air mobile device update tree is received from an over-the-air mobile device update framework server in an over-the-air mobile device update payload by a mobile device, wherein a node on the over-the-air mobile device update tree references a function call. For example, the over-the-air mobile device update node may be an open mobile alliance (OMA) device management (DM) node. For example, the OMA DM tree 108 is received in an OMA DM payload by the mobile communication device 102. In an embodiment, an OMA DM node 110 may reference a function call, for example a delete function that deletes a selected function or that deletes a preinstalled application, for example to conserve memory of the mobile communication device 102. While the teachings of this disclosure are often presented in terms of the OMA DM framework and/or protocol, it is understood that these teachings may also be applied using other over-the-air mobile device update frameworks.

At block 504, the over-the-air mobile device update tree is parsed by the mobile device 102. At block 506, preloaded applications on the mobile device 102 are configured based on the over-the-air mobile device update node. For example, the OMA DM tree 108 may be applied to configure the mobile communication device 102, and the preloaded applications 118 may be configured by corresponding OMA DM nodes 110. For example, some preloaded applications may be activated, some preloaded applications may be disabled, and other preloaded applications may be deleted. At block 508, one or more of the functions are invoked based on at least the identity of the brand. For example, when the OMA DM nodes 110 that reference function calls are used to configure the preloaded applications 118, the corresponding functions may be invoked based on at least the identity of the brand. Different brands may invoke or disable the same preloaded application 118.

Figure 6:
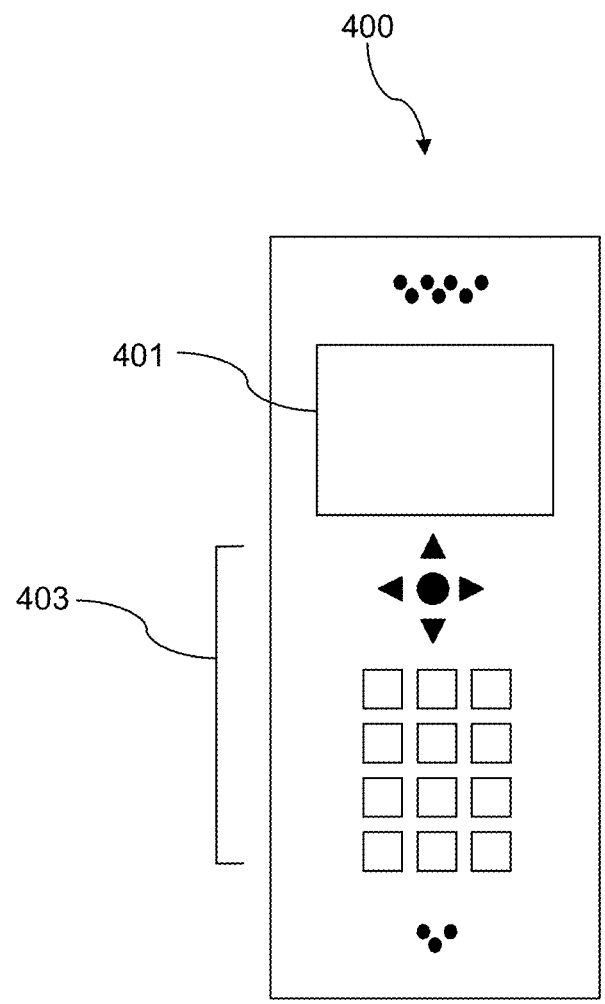
FIG. 6 is an illustration of a mobile communication device according to an embodiment of the disclosure.

FIG. 6 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 401 and a touch-sensitive surface and/or keys 403 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 401 to show a web page. The web page may be obtained via wireless communications with a base transceiver station, a wireless network access node, a peer mobile device 400 or any other wireless communication network or system.

Figure 7:
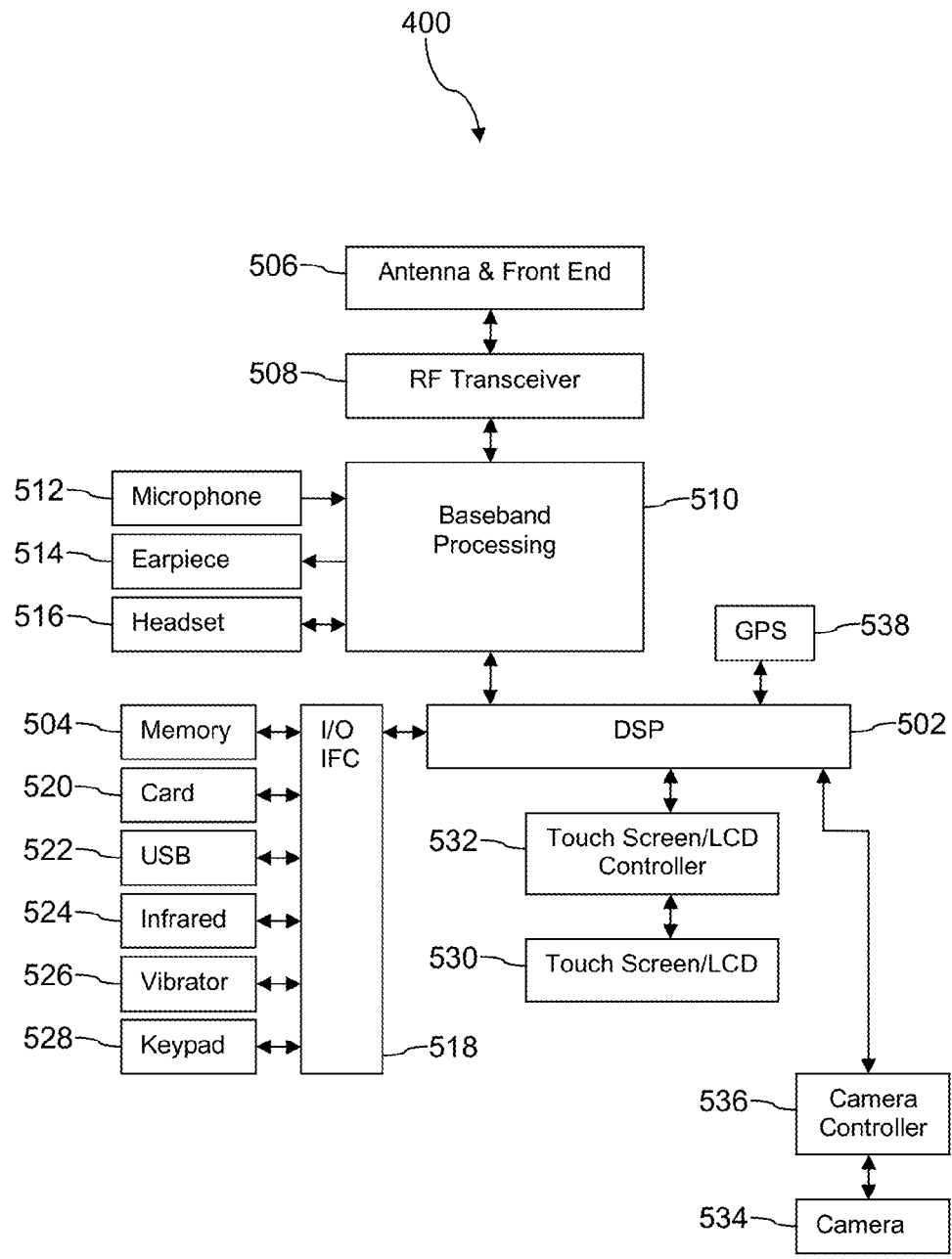
FIG. 7 is a block diagram of a mobile communication device according to an embodiment of the disclosure.

FIG. 7 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 8A:
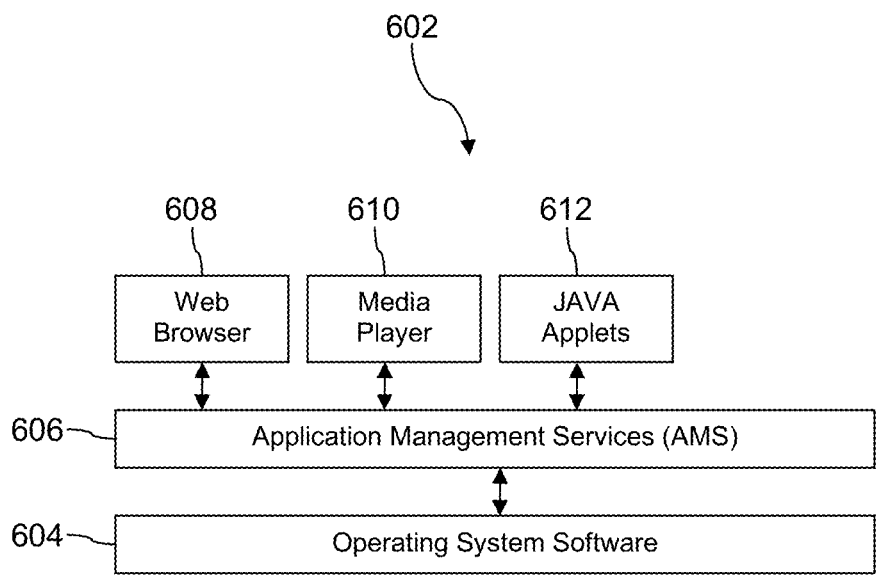
FIG. 8A is a block diagram of a software architecture of a mobile communication device according to an embodiment of the disclosure.

FIG. 8A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 8A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 8B:
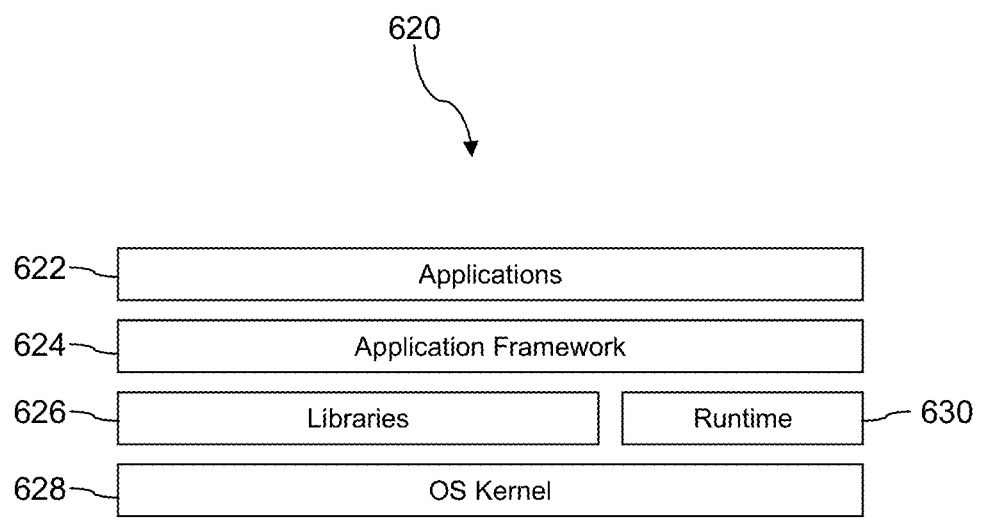
FIG. 8B is a block diagram of another software architecture of a mobile communication device according to an embodiment of the disclosure.

FIG. 8B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 9:
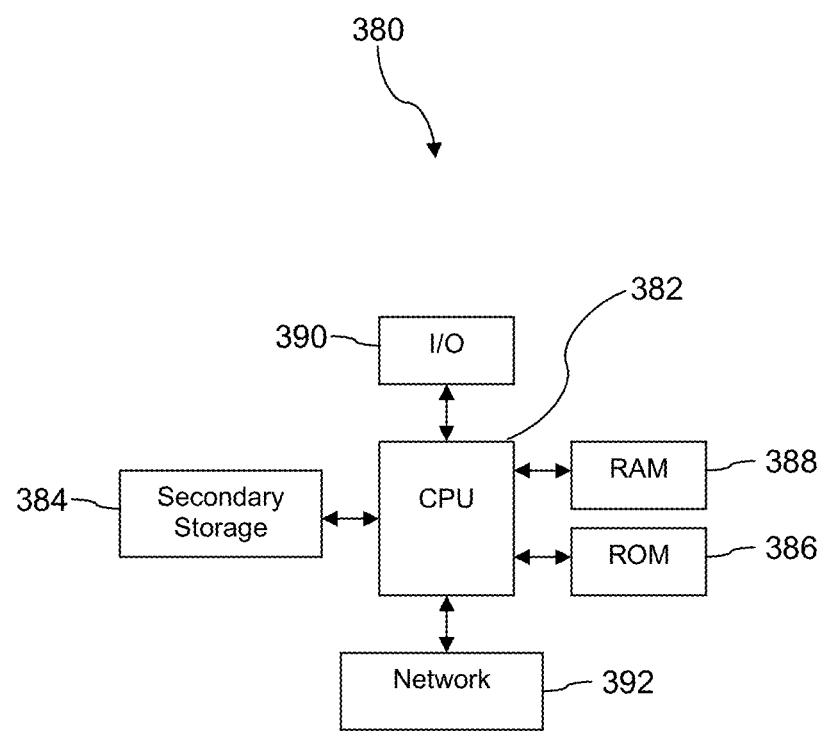
FIG. 9 is a block diagram of a computer system according to an embodiment of the disclosure.

FIG. 9 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile communication device, comprising:
   a processor;
   a memory;
   an application stored in the memory that, when executed by the processor:
      parses an open mobile alliance (OMA) device management (DM) tree comprising a leaf node that references a file with a data structure of a matrix form including columns indexed by a brand identity and rows indexed by a service identity, wherein the leaf node is parsed and applied during a first activation of the mobile communication device or when an update is made to the leaf node, wherein the matrix referenced by the leaf node simultaneously stores configuration values for a plurality of brands and a plurality of services, and wherein some of the configuration values comprise function calls,
      based on a brand identity of the mobile communication device, selects an-entry of the matrix referenced by the leaf node corresponding to the brand identity of the mobile communication device, and
      configures a preloaded application stored in the memory based on the selected entry of the matrix referenced by the leaf node corresponding to the brand identity of the mobile communication device after a boot completed intent is received, wherein a system-level flag in configuration settings of an operating system is set to keep an enabling/disabling status of the preloaded application during a power off, wherein the leaf node referencing the matrix is utilized to configure more than one brand and more than one pre-loaded application or process, and wherein a brand of the plurality of brands, a service of the plurality of services, or a cell in the matrix referenced by the leaf node is added, deleted, or changed without changing a definition of the OMA DM tree and without interaction with a standards entity.

2. The mobile communication device of claim 1, wherein the matrix is received by the mobile communication device in a file.

3. The mobile communication device of claim 1, wherein the configuration values enables or disables preloaded applications, starts or stops a process of the preloaded applications, or deletes the preloaded applications.

4. The mobile communication device of claim 1, wherein an OMA DM client on the mobile communication device receives the OMA DM tree and a listener application from the operating system of the mobile communication device parses the OMA DM tree.

5. The mobile communication device of claim 4, wherein the listener application of the operating system monitors updates on OMA DM nodes, catches the update, and applies the update.

6. The mobile communication device of claim 1, wherein based on the selected entry, one or more of the function calls are invoked based on at least the brand identity.

7. A method of managing preloaded applications for different brands of a mobile communication device with an open mobile alliance (OMA) device management (DM) node, comprising:
   receiving, by an application stored in a non-transitory computer readable medium of a mobile communication device and executable by a processor of the mobile communication device, an OMA DM tree from an OMA DM server in an OMA DM payload, wherein a leaf node on the OMA DM tree references a file with a data structure of a matrix form;
   parsing, by the application, the OMA DM tree, wherein the leaf node is parsed and applied during a first activation of the mobile communication device or when an update is made to the leaf node;
   selecting, by the application, one or more entries of the matrix referenced by the leaf node corresponding to a brand identity associated with the mobile communication device, wherein the matrix referenced by the leaf node comprises columns indexed by a brand identity and rows indexed by a service identity and simultaneously stores configuration values for a plurality of brands and a plurality of services, and wherein the configuration values comprise function calls; and
   configuring, by the application, preloaded applications on the mobile communication device based on the selected one or more entries of the matrix referenced by the leaf node corresponding to the brand identity of the mobile communication device after a boot completed intent is received, wherein a system-level flag in configuration settings of an operating system is set to keep an enabling/disabling status of a preloaded application during a power off, wherein the leaf node referencing the matrix is utilized to configure more than one brand and more than one pre-loaded application or process, and wherein a brand of the plurality of brands, a service of the plurality of services, or a cell in the matrix referenced by the leaf node is added, deleted, or changed without changing a definition of the OMA DM tree and without interaction with a standards entity.

8. The method of claim 7, wherein the mobile communication device is one of a laptop computer, a notebook computer, a tablet computer, a mobile phone, or a personal digital assistant (PDA), and wherein mobile communication device is provided with radio communications by a radio frequency transceiver within the mobile communication device based on at least one of code division multiple access (CDMA), global system for mobile communication (GSM), long term evolution (LTE), or worldwide interoperability for microwave access (WiMAX) wireless communication protocols.

9. The method of claim 7, wherein the configuration values are one of an enable/disable flag or a reference to a function call.

10. The method of claim 9, wherein by applying one of the configuration values to one of the preloaded applications, the one of the preloaded applications is enabled, disabled, or deleted.

11. The method of claim 10, wherein the one of the preloaded applications is enabled for a brand and disabled for a different brand.

12. A method of managing preloaded applications for different brands of a mobile device with an over-the-air mobile device update node, comprising:

receiving, by an application stored in a non-transitory computer readable medium of a mobile device and executable by a processor of the mobile device, an over-the-air mobile device update tree from an over-the-air mobile device update framework server in an over-the-air mobile device update payload, wherein a leaf node on the over-the-air mobile device update tree identifies a matrix that comprises columns indexed by a brand identity and rows indexed by a service identity and simultaneously stores configuration values for a plurality of brands and a plurality of services, and wherein some of the configuration values comprise function calls;

parsing, by the application, the over-the-air mobile device update tree, wherein the leaf node is parsed and applied during a first activation of the mobile device or when an update is made to the leaf node;

based on a brand identity of the mobile device, selecting, by the application, one or more entries of the matrix referenced by the leaf node corresponding to the brand identity of the mobile device;

configuring, by the application, preloaded applications on the mobile device based on the selected one or more entries of the matrix referenced by the leaf node corresponding to the brand identity of the mobile device after a boot completed intent is received, wherein a system-level flag in configuration settings of an operating system is set to keep an enabling/disabling status of a preloaded application during a power off, wherein the leaf node referencing the matrix is utilized to configure more than one brand and more than one pre-loaded application or process, and wherein a brand of the plurality of brands, a service of the plurality of services, or a cell in the matrix referenced by the leaf node is added, deleted, or changed without changing a definition of the over-the-air mobile device update tree and without interaction with a standards entity; and invoking one or more of the function calls based on at least the brand identity of the mobile device.

13. The method of claim 12, wherein the one or more function calls invoked is to delete a preloaded application.

14. The method of claim 12, wherein the leaf node is an open mobile alliance (OMA) device management (DM) node.

15. The method of claim 12, wherein the one or more function calls invoked is to enable, disable, or toggle between enable and disable a preloaded application.

\* \* \* \* \*